US 011588559B2

(12) United States Patent
Chen (10) Patent No.: US 11,588,559 B2
(45) Date of Patent: Feb. 21, 2023

(54) IN-PHASE TO QUADRATURE-PHASE IMBALANCE IN AN OPTICAL DATA MODULATOR

(71) Applicant: Nokia Solutions and Networks Oy, Espoo (FI)

(72) Inventor: Xi Chen, Aberdeen, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/583,317

(22) Filed: Jan. 25, 2022

(65) Prior Publication Data

US 2022/0239382 A1 Jul. 28, 2022

Related U.S. Application Data

(60) Provisional application No. 63/141,960, filed on Jan. 26, 2021.

(51) Int. Cl.
*H04B 10/69* (2013.01)
*H04J 14/02* (2006.01)
*H04B 10/61* (2013.01)

(52) U.S. Cl.
CPC ....... *H04B 10/691* (2013.01); *H04B 10/6164* (2013.01); *H04B 10/6933* (2013.01); *H04J 14/0206* (2013.01); *H04J 14/0298* (2013.01)

(58) Field of Classification Search
CPC .............. H04B 10/691; H04B 10/6164; H04B 10/6933; H04B 10/541; H04B 10/613;
(Continued)

(56) References Cited

U.S. PATENT DOCUMENTS 7,277,040 B2 10/2007 Mazhar
7,336,365 B2 * 2/2008 Waagaard .......... G01D 5/35312
356/478
(Continued)

FOREIGN PATENT DOCUMENTS

CN 101627599 A * 1/2010 ......... H04B 17/0085

OTHER PUBLICATIONS

Liang et al., "Transceiver in-phase and quadrature imbalance monitoring by two stage MIMO equalizers", Asia Communications and Photonics Conference (ACP), Oct. 26-29, 2018, 4 pages.
(Continued)

*Primary Examiner* — Abbas H Alagheband
(74) *Attorney, Agent, or Firm* — Nokia Technologies Oy (57) ABSTRACT

An apparatus includes an optical source of an optical wavelength carrier, an optical modulator to receive the optical wavelength carrier, and an optical data receiver. The optical data modulator is configured to produce, from the optical wavelength carrier, an optical signal to carry separate data on different first and second components thereof in individual modulation periods during data transmission and to carry a training sequence on one of the components during time slots for calibration. The first component is relatively phase offset from the second component in the optical signal. The optical data modulator alternates the one of the components between the first and second components over the time slots for calibration. The optical receiver is connected to receive a portion of the optical signal and to temporally interleave a measurement of a characteristic of the first component and a measurement of a characteristic of the second component over the time slots for calibration. The optical receiver is configured to feedback information to the optical data modulator based on the measured characteristics. The optical data modulator is configured to reduce
(Continued)

an imbalance between the two components of the optical carrier during data transmission based on the information.

17 Claims, 4 Drawing Sheets

(58) Field of Classification Search
CPC .............. H04B 10/6165; H04J 14/0206; H04J 14/0298; H04J 14/06
See application file for complete search history.

(56) References Cited

U.S. PATENT DOCUMENTS

| | | | |
|---|---|---|---|
| 9,077,455 B2 | 7/2015 | Randel et al. | |
| 9,104,084 B2* | 8/2015 | Tipper | H04B 10/50575 |
| 9,203,682 B2* | 12/2015 | Winzer | H04L 27/0014 |
| 9,979,472 B1* | 5/2018 | Wang | H04B 10/532 |
| 10,082,718 B2* | 9/2018 | Schmogrow | G02F 1/0123 |
| 10,181,899 B2 | 1/2019 | Fan et al. | |
| 10,727,854 B1 | 7/2020 | Greshishchev et al. | |
| 2015/0086216 A1* | 3/2015 | Xie | H04B 10/61 398/186 |
| 2017/0222725 A1* | 8/2017 | Bhandare | H04B 10/50572 |
| 2018/0076901 A1* | 3/2018 | Yue | H04B 10/564 |
| 2018/0109348 A1* | 4/2018 | Salsi | H04B 10/503 |
| 2018/0248620 A1* | 8/2018 | Wang | H04B 10/532 |
| 2019/0305854 A1* | 10/2019 | Campos | H04B 10/6164 |
| 2020/0204262 A1* | 6/2020 | Geyer | H04B 10/0775 |

OTHER PUBLICATIONS

Savory, "Digital Coherent Optical Receivers: Algorithms and Subsystems", IEEE Journal of Selected Topics in Quantum Electronics, vol. 16, No. 5, Sep.-Oct. 2010, pp. 1164-1179.

Chen et al., "Direct-Detection Based Frequency-Resolved I/Q Imbalance Calibration for Coherent Optical Transmitters", Optical Fiber Communication Conference (OFC), Jun. 2021, 3 pages.

Eun et al., "A new Volterra predistorter based on the indirect learning architecture", IEEE Transactions on Signal Processing, vol. 45, No. 1, Jan. 1997, pp. 223-227.

Dai et al., "Machine Learning Aided In-phase/Quadrature Skew and Imbalance Calibration for Coherent Optical Transmitters", Optical Fiber Communications Conference and Exhibition (OFC), Mar. 3-7, 2019, 3 pages.

Faruk et al., "Compensation for In-Phase/Quadrature Imbalance in Coherent-Receiver Front End for Optical Quadrature Amplitude Modulation", IEEE Photonics Journal, vol. 5, No. 2, Apr. 2013, 10 pages.

Tandur et al., "Joint Adaptive Compensation of Transmitter and Receiver IQ Imbalance Under Carrier Frequency Offset in OFDM-Based Systems", IEEE Transactions on Signal Processing, vol. 55, No. 11, Nov. 2007, pp. 5246-5252.

Chen et al., "Signal-carrier interleaved optical OFDM for direct detection optical communication", Optics Express, vol. 21, No. 26, 2013, pp. 32501-32507.

Peng et al., "Experimental Demonstration of a Coherently Modulated and Directly Detected Optical OFDM System Using an RF-Tone Insertion", Conference on Optical Fiber Communication/National Fiber Optic Engineers Conference, Feb. 24-28, 2008, 3 pages.

Chen et al., "Frequency-Resolved Measurements of Signal, Noise, and Signal-Signal Beat Interference in Self-Coherent Direct-Detection Receivers", Optical Fiber Communications Conference and Exposition (OFC), Mar. 11-15, 2018, 7800110, 3 pages.

Alvarado et al., "Replacing the Soft-Decision FEC Limit Paradigm in the Design of Optical Communication Systems", Journal of Lightwave Technology, vol. 33, No. 20, Oct. 15, 2015, pp. 4338-4352.

Chen et al., "An Accurate and Robust In-phase/Quadrature Skew Measurement for Coherent Optical Transmitter by Image Spectrum Analyzing", European Conference on Optical Communication (ECOC), Sep. 17-21, 2017, 3 pages.

Chen et al., "16384-QAM transmission at 10 GBd over 25-km SSMF using polarization-multiplexed probabilistic constellation shaping", 45th European Conference on Optical Communication, Sep. 22-26, 2019, pp. 1-4.

Chen, "Generation and Detection of Ultra-high Order QAM Signals", ACP, 2019, 3 pages.

Amin et al., "A hybrid IQ imbalance compensation method for optical OFDM transmission", Optics Express, vol. 18, No. 5, Mar. 1, 2010, pp. 4859-4866.

\* cited by examiner

IN-PHASE TO QUADRATURE-PHASE IMBALANCE IN AN OPTICAL DATA MODULATOR

This application claims the benefit of U.S. provisional patent application No. 63/141,960, "IN-PHASE TO QUADRATURE-PHASE IMBALANCE IN AN OPTICAL DATA MODULATOR", by Xi Chen, filed on Jan. 26, 2021.

BACKGROUND

Technical Field

The invention relates to apparatus for optical measurement and optical data transmission.

Related Art

This section introduces aspects that may be help to facilitate a better understanding of the inventions. Accordingly, the statements of this section are to be read in this light and are not to be understood as admissions about what is prior art or what is not prior art.

Due to a demand for higher data rates, coherent optical systems have become important to optical fiber communications. In many coherent optical communication systems, two dimensions of the optical wavelength carrier are separately modulated to carry different or independent data streams, e.g., the I and Q components. Such combined I and Q modulation can enable the transmission of multiple bits of data on a single modulation symbol, e.g., via quadrature phase keying (QPSK) or quadrature amplitude modulation (QAM).

For such modulation, an optical data modulator may be imbalanced so that the separate data streams are not carried on respective I and Q components of the optical wavelength carrier and/or are modulated with different symbol-averaged powers onto said two components. Herein, an I/Q imbalance refers to an undesired phase shift and/or a symbol-averaged amplitude difference between the two components of an optical signal, which carry the separate data streams, wherein the two components are offset by a phase. For example, if a phase offset between the two separately modulated components of the optical wavelength carrier is not close to $\pi/2$ radians or $3\pi/2$ radians, an I/Q imbalance is typically said to exist. Such I/Q imbalances may sometimes be digitally compensated based on measurements at the coherent optical receiver via digital processing in the digital signal processor (DSP) of said coherent optical receiver.

SUMMARY OF SOME ILLUSTRATIVE EMBODIMENTS

Various embodiments provide apparatus and/or methods for measuring and optionally compensating I/Q imbalances at the optical output of an optical data modulator and/or of a coherent optical data transmitter. In various embodiments, the I/Q imbalance is measured without use of a remote coherent optical receiver. Thus, such measurements can avoid discrepancies related to I/Q imbalances produced in the coherent optical receiver itself. Separate compensation of I/Q imbalance at the coherent optical transmitter may be useful in enabling coherent optical data communications at higher symbol rates, e.g., greater than 60 giga(G)-baud, and/or for larger symbol constellations, e.g., QAM of order higher than 64. Also, such separate compensation of such imbalances at a coherent optical transmitter may enable a coherent optical receiver to use simpler digital processing to compensate of any I/Q imbalance caused by optical processing and detection therein. Herein, various embodiments provide for determination of information indicate of such imbalances, e.g., via an optical receiver located at or near an optical output of an optical data modulator and/or a coherent optical data transmitter. Also, various embodiments may use the same apparatus to obtain such information in a temporally interleaved manner with respect to the two modulated components so that hardware imprecisions used for the determinations do not significantly the precision of the determined information.

In first embodiments, an apparatus includes an optical source of an optical wavelength carrier, an optical data modulator connected to receive the optical wavelength carrier, and an optical receiver. From the optical wavelength carrier, the optical data modulator is configured to produce an optical signal to carry separate data streams on first and second components thereof in individual modulation periods during data transmission and to carry a training sequence on one of the components during time slots for calibration. The first component is offset from the second component by a relative phase shift. The apparatus is configured such that the optical data modulator alternates the one of the components between the first and second components over the time slots for calibration. The optical receiver is connected to receive a portion of the optical signal and to temporally interleave a measurement of a characteristic of the first component and a measurement of a characteristic of the second component over the time slots for calibration. The optical receiver is configured to feedback information to the optical data modulator based on the measured characteristics. The optical data modulator is configured to reduce an imbalance between the components of the optical carrier during data transmission based on the information.

In some of the first embodiments, the imbalance may include an intensity difference between the components, e.g., for an intensity averaged over symbol values.

In any of the first embodiments, the imbalance may include a frequency-dependent phase offset between the components.

In any of the first embodiments, the optical receiver may use a same photodetector to measure the characteristic of the first component and to measure the characteristic of the second component during the time slots for calibration.

In any of the first embodiments, the optical receiver may use a same optical mixer to interfere light of the first component and to interfere light of the second component during the time slots for calibration.

In any of the first embodiments, the information may be indicative of a frequency dependence of an optical channel matrix for light of the first component and/or a frequency dependence of an optical channel matrix of light of the component.

In any of the first embodiments, the optical data modulator may include first and second optical modulation sections connected to receive portions of the optical wavelength carrier in parallel, wherein each of the optical modulation sections is configured to output light of a corresponding one of the components of the optical signal.

In any of the first embodiments, the optical data modulator may be configured to pre-compensate modulation of data streams onto the optical waveguide carrier during data transmission based on the information fed back by the optical receiver.

In second embodiments, a method includes, during a calibration period, causing an optical data modulator to output an optical signal with a training modulation on a first component in first time slots and to output the optical signal with a training modulation on a different second component in second time slots. The first component is relatively phase shifted with respect to the second component, and the second time slots are temporally interleaved with the first time slots. The method also includes producing measurements of a frequency-dependent characteristic of the optical signal in the first and second time slots. The method also includes, during a data transmission period, operating the optical data modulator to output the optical signal with a data-modulation on two components in each data modulation slot based on values of the frequency-dependent channel characteristic measured in the first and second time slots.

In some of the second embodiments, the characteristic may be indicative of an optical channel matrix of light of the optical signal.

In any of the second embodiments, the method may further include adjusting the optical data modulator to reduce an imbalance between a symbol-averaged power of the two components during the data transmission period based on the measurements produced in the first and second time slots.

In any of the second embodiments, the method may further include adjusting the optical data modulator to adjust the relative phase between the two components during the data transmission period based on the measurements produced in the first and second time slots.

In any of the second embodiments, the producing measurements may be performed using a same photodetector in the first and second time slots.

In any of the second embodiments, the producing measurements may be performed using a same optical interference device in the first and second time slots. In some such second embodiments, the producing measurements may be performed by a same photodetector measuring light from a same one or more optical outputs of the optical interference device in the first and second time slots.

In various Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

U.S. provisional patent application No. 63/141,960 is incorporated herein, by reference, in its entirety.

Figure 1:
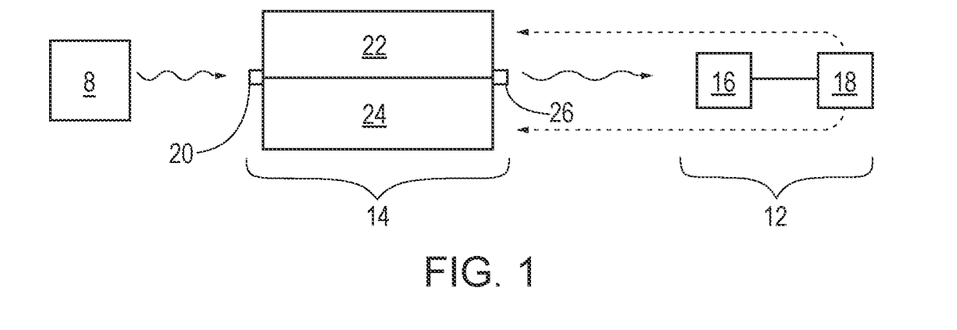
FIG. 1 is a block diagram schematically illustrating an optical data transmitter configured to measure imbalances between two components used to carry separate data streams in an optical signal transmitted during data transmission.

FIG. 1 shows an optical data transmitter 10 that includes an optical source 8, an optical data modulator 14, and an optical receiver 12 for determining information relating to imbalances of the optical data modulator 14.

The optical source 8 is typically a laser, e.g., a narrow band optical telecommunication laser such as an external cavity laser. The optical source 8 outputs an optical wavelength carrier to an optical input 20 of the optical data modulator 14.

The optical data modulator 14 includes first and second optical modulation sections 22, 24, which receive separate portions of optical wavelength carrier from the optical input 20. Each optical modulation section 22, 24 modulates a single component of the received portion of the optical wavelength carrier, e.g., with a corresponding data or training stream of values. The modulated optical wavelength carriers from the two modulation sections 22, 24 are combined in the optical data modulator 14. Thus, the optical data modulator 14 has an optical output 26 that outputs an optical signal that is a superposition of different first and second components. The first component is relatively phase shifted from the second component in the output optical signal. The first and second components are separately modulated by the respective first and second optical modulation sections 22, 24.

The optical receiver 12 receives a portion of the optical signal output by the optical data modulator 14, e.g., from an optical tap along an optical path between the optical output 26 of the optical data modulator 14 and an optical output of the optical data transmitter 10. The optical receiver 12 includes an optical detector 16 and a digital signal processor (DSP) 18. The optical detector 16 provides digitalized measurements of the portion of the optical signal received by the optical receiver 12, i.e., at least during calibration period(s). From the digitalized measurements, the DSP 18 determines information relating to the relative intensity and/or alignment of the first and second components of the optical signal output by the optical data modulator 14 during data transmission periods. In some embodiments, said information is fed back to the optical data modulator 14, i.e., as illustrated by dotted arrow lines in FIG. 1, so that the optical data modulator 14 may adjust a relative phase offset and/or a time-averaged amplitude imbalance between the first and second components in the optical signal. For example, the adjustments may enable the optical data modulator 14 to set and/or substantially maintain the relative phase offset to about $\pi/2$ or about $3\pi/2$ radians and/or to set and/or substantially maintain the symbol-averaged amplitude imbalance to a low value, during subsequent data transmission on both modulated dimensions of the optical signal from the optical data transmitter 10 of FIG. 1, e.g., over the frequency range of the data being transmitted.

Figure 2:
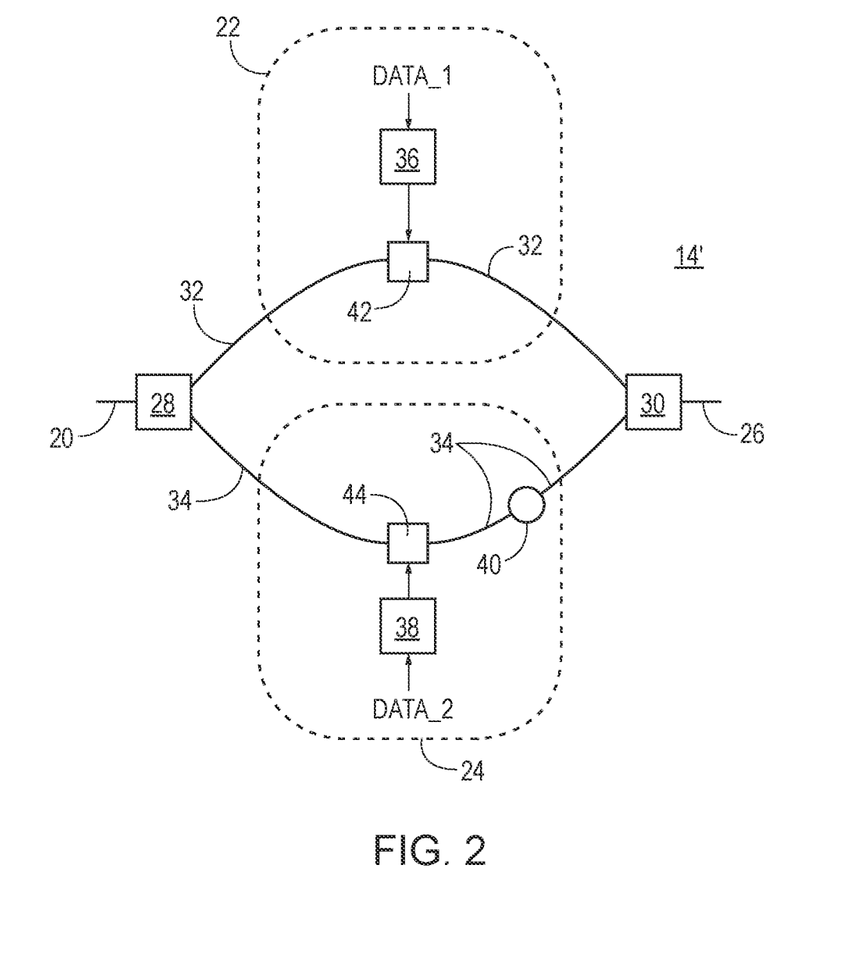
FIG. 2 is a block diagram schematically illustrating a specific example of the multi-phase-component, optical data modulator of FIG. 1.

FIG. 2 illustrates one example 14' of the optical data modulator 14 of FIG. 1. The optical data modulator 14' has separate optical modulation sections 22, 24, which modulate different portions of the received optical wavelength carrier, temporally in parallel.

The optical data modulator 14' includes a 1×2 optical power splitter 28, a 2×1 optical power combiner 30, parallel first and second optical paths 32, 34, corresponding first and second electrical drivers 36, 38, and an optionally an adjustable optical phase shifter 40. Each optical driver 36, 38 is connected to cause a corresponding electro-optical data modulator 42, 44 to modulate a corresponding received data stream, i.e., DATA_1 or DATA_2, onto one dimension of the portion of the optical wavelength carrier received therein, e.g., amplitude modulate said received portion of the optical wavelength carrier. The electro-optical data modulators 42, 44 may have various conventional forms, e.g., Mach-Zehnder interferometric modulators and/or optical ring resonator-type data modulators. The 2×1 optical power combiner combines the two data-modulated optical carriers from the first and second optical paths 32, 34 to form the optical signal output by the optical data modulator 14'. In the output optical signal, the two data-modulated optical carriers, i.e., the two components, are superimposed with a relative phase shift. Thus, the optical data modulator 14' outputs an optical carrier in which the two different components carry separate data modulations. The relative phase offset between the two components in the output optical signal is typically due to the optical path length difference between the optical paths 32, 34.

For the optical signal output by the optical data modulator 14', the relative phase offset between the data-modulated components from the optical paths 32 and 34 may be adjusted by electrically adjusting operation of the electrical drivers 36, 38 and/or by electrically adjusting an optional variable phase shifter 40. In various embodiments, such electrical adjustments may be facilitated by feedback of information from the DSP 18 of FIG. 1. For example, such information may be used by the electrical drivers 36, 38 to cause pre-compensation of the data sequences modulated thereby such that the relative phase offset is about $\pi/2$ radians between the two components and/or a data symbol-averaged power imbalance between said two components is substantially absent in the optical signal transmitted to the optical output 26 of the optical data modulator 14' during subsequent data transmission periods.

Figure 3:
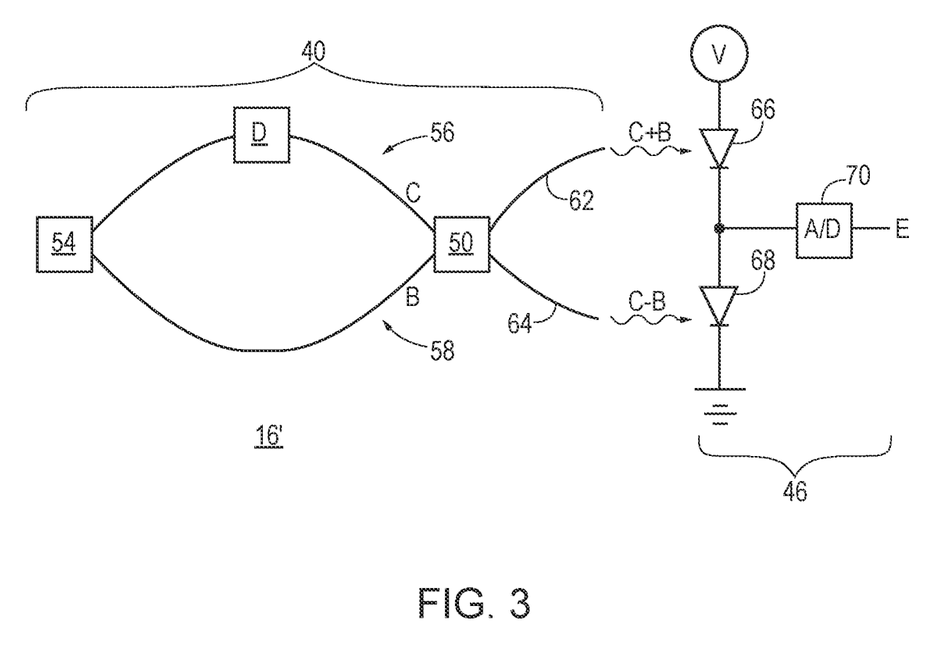
FIG. 3 is a block diagram schematically illustrating a portion of a specific example of the optical receiver of FIG. 1.

FIG. 3 shows an example 16' of the optical detector 16 of FIG. 1. The optical detector 16' includes an optical interference circuit 40 and a photodetector circuit 46.

The optical interference circuit 40 includes a 1×2 optical power splitter 54, first and second optical paths 56, 58, and a 2×2 optical coupler 50. The 1×2 optical power splitter receives light from the optical input of the optical circuit 16' and transmits portions thereof, e.g., about equal portions, about in parallel, to the first and second optical paths 56, 58, e.g., planar optical waveguide paths. For example, about equal powers may be transmitted to each optical path 56, 58. The first and second optical paths 56, 58 transmit light to corresponding optical inputs of the 2×2 optical coupler 50. The first optical path 56 includes a time delay D so that the 2×2 optical coupler 50 interferes light "C" from the first path 56 with light "B" from second optical paths 48 with a relative time delay D. The 2×2 optical coupler 50, e.g., a conventional, symmetric, 2×2 planar, optical waveguide coupler, is configured to output approximately a sum of the received light, i.e., C+B, to a first optical output 62 and a difference of the received light, i.e., C−B, to a second optical output 64.

The photodiode detector 46 includes a pair of photodiodes 66, 68. The photodiode 66 is configured to measure the intensity of the light C+B from optical output 62, and the photodiode 68 is configured to measure the intensity of the light C−B from the optical output 64. The photodiodes are serially DC biased across a voltage V and connected to provide an electrical output signal therebetween to an analog-to-digital converter (A/D) 70. The photodiodes 66, 68 may be a conventional balanced pair so that the electrical output signal provides a measure of the mixing between C and B, i.e., substantially outputs an electrical measure of CB*+B*C. Thus, the electrical output signal provides a measure of an intermediate frequency signal, e.g., a signal near baseband for the optical data modulator 14, 14'. The digital converter (A/D) 70 transmits a digitalized form E of said electrical output signal to the input of the DSP 18 of FIG. 1 for further processing.

The optical circuit 16' directly detects the portion of the optical signal received from the optical output 26 of the optical data modulator 14, e.g., without mixing said received optical signal with the unmodulated optical wavelength carrier from the light source 12. While the optical circuit 16' is configured provide measurements indicative of the intermediate frequency signal CB*+B*C, the digital electrical output signal E may have other contributions, e.g., due to fabrication imprecisions in the optical interference circuit 40 and/or the photodetector 46.

To reduce effects of such fabrication imprecisions, the optical data modulator 14, 14' of FIGS. 1 and 2 may be operated, during calibration, such that the same optical detector 16, 16' of FIGS. 1 and 3 measures the modulated optical wavelength carriers from the two optical modulator sections 22 and 24 in separate time slots. In particular, the first modulator section 22 may be operated to not output light in the time slots for measuring the second component produced by the second modulation section 24, and the second modulation section 24 may be operated to not output light in the other time slots for measuring the first component produced by the first modulation section 22. In examples where the optical modulation sections 22, 24 are Mach-Zehnder (MZ) optical modulators, one MZ optical modulator may be operated to cause destructive interference of light from different optical paths therein so that substantially no light is outputted therefrom during the time slots for measuring the optical signal output by the other MZ optical modulator. In such embodiments, the calibration measurements on the two components of the optical signal produced by the optical data modulator 14, 14' are performed in a temporally interleaved manner. Since the same optical interference circuit 40, the same optical outputs 62, 64, and same photodetector 46 process light received in the time slots for measuring both components during calibration, the determined information relating to imbalances therebetween is less susceptible to errors due to fabrication imprecisions in the optical receiver 16, 16' of FIGS. 1 and 3.

Figure 4:
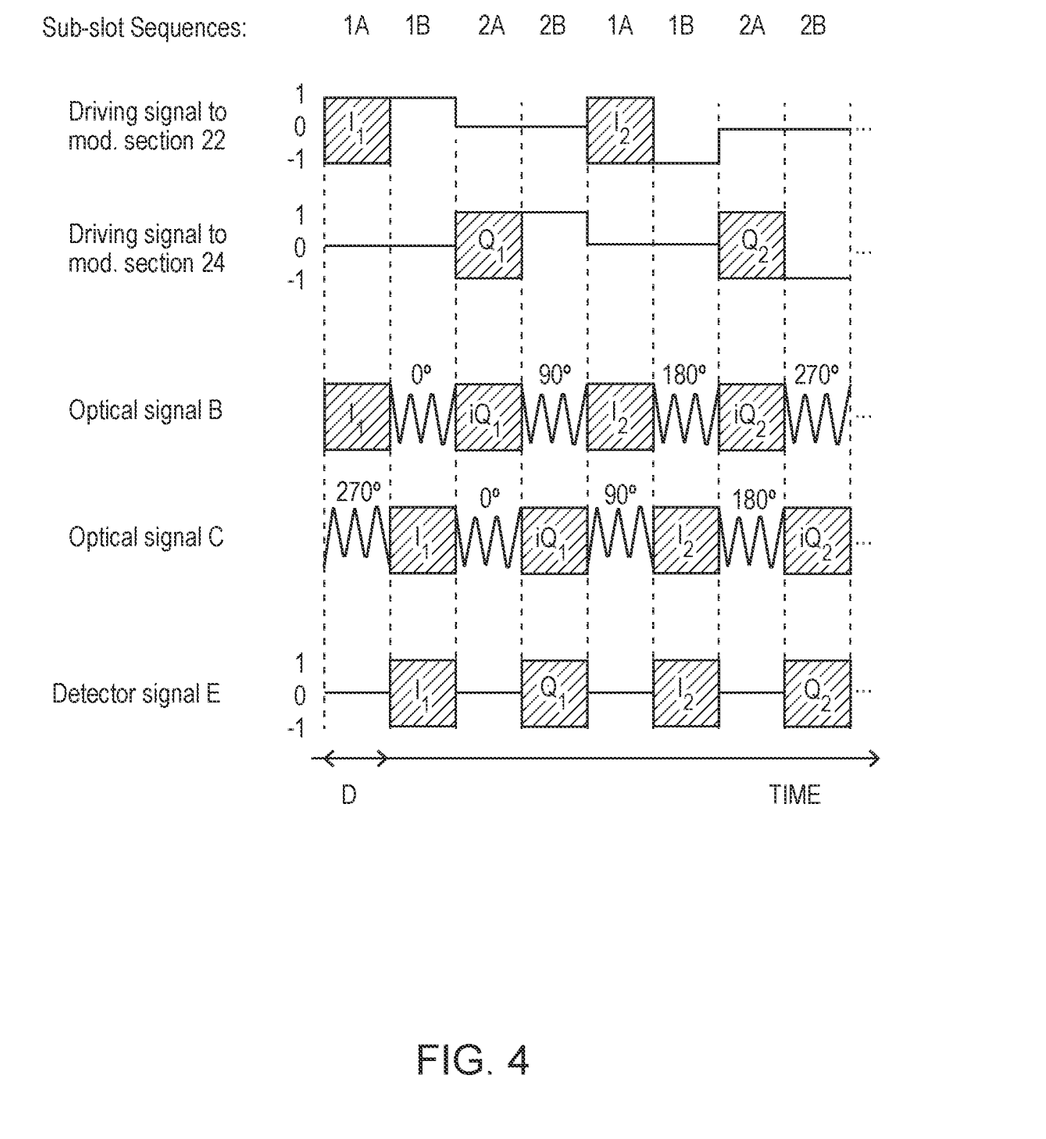
FIG. 4 schematically illustrates signals used to determine a calibration of an optical data modulator in an optical data transmitter that transmits data on two components during data transmission, e.g., the signals may be used to calibrate the optical data modulator of FIGS. 1-2 with the optical receiver of FIG. 3.

FIG. 4 is a timing diagram illustrating an example method for measuring the two separately modulated components of the optical signal output by the optical data modulator 14, 14' of FIGS. 1 and 2 in a temporally interleaved manner. In the specifically illustrated examples, example driver values of "0" cause the relevant modulation section 22 or 24 to output an optical signal of substantially zero intensity, optical signal, and example driver values of "+1" or "−1" cause the modulation section 22 or 24 to output an optical signal of substantial intensity. For example, in a two-arm MZ optical modulator, the driver value of "0" may cause destructive interference of light from the two arms of the MZ optical modulator at the optical output thereof, and the driver values of "+1" and "−1" may cause constructive interference of light from the two arms at the same optical output. In other unshown embodiments, other different driver values may be used to cause such destructive and constructive interference.

The top part of FIG. 4 schematically illustrates the electrical drive signals that separately operate the first optical modulation section 22 and the optical second modulation section 24 during the calibration measurements relating to determining an imbalance between the components of the output signal produced by the first and second modulation sections 22, 24. In first time slots 1, the first optical modulation section 22 is operated to output an optical signal, and in interleaved second time slots 2, the second optical modulation section 24 is operated to output an optical signal. In each individual time slot 1 or 2, only one of the first and second optical modulation sections 22 or 24 outputs an optical signal of substantial intensity, i.e., the other of the optical modulation section 24 or 22, respectively, is driven with a driver value "0" to ensure that no optical signal is output therefrom. Each of the first and second time slots 1 and 2 is further divided into a pair of sub-slots, i.e., sub-slots 1A and 1B and sub-slots 2A and 2B, respectively. In the A-type sub-slots 1A and 2A, the one of the modulation sections, i.e., 22 or 24, is driven by a sequence of training signals, as indicated by gray boxes of drive values, and outputs an optical signal carrying a sequence of training symbols. In the B-type sub-slots 1B and 2B of the same time slot 1, 2, the same one of the modulation sections 22 or 24 is driven by a constant driver value, e.g., +1 or −1, to output an unmodulated optical carrier. In different ones of the B sub-slots, the unmodulated optical carrier may have a different overall phase shift of 0°, 90°, 180°, or 270°. Here, the A-type and B-type sub-slots may all have, e.g., about ½ of the length of the type 1 and 2 time slots. The A-type and B-type sub-slots typically are of about the same length as the delay D produced by the delay element D of optical detector 16' of FIG. 3.

The middle part of FIG. 4 illustrates the two optical signals C and B received at the optical inputs of the 2×2 optical coupler 50 of FIG. 3. In each A and B sub-slot, one of the optical signals C or B carries a training data sequence, and the other of the optical signals B or C carries an optical wavelength carrier without a time-varying modulation and with a constant phase shift, e.g., about 0°, 90°, 180°, or 270°. For example, one way to perform the training is illustrated by the timing sequence of FIG. 4. In that timing sequence, for the B sub-slots, phase shifts of about 0° and 180° correspond to optical signals from the first modulation section 22, and phase shifts of about 90° and 270° correspond to optical signals from the second modulation section 24. Thus, in this example, the second-type B sub-slots, correspond to sub-slots for which both optical signals C and B are produced by the same one of the modulation sections 22 or 24. That is, the digital measurement signals E of the B-type sub-slots 1B or 2B, provide measurements of characteristics relating to the optical signal output by only one of the optical modulation sections 22 or 24. The digital measurement signals E of such B-type sub-slots 1B, 2B are used by the DSP 18 of FIG. 1 to obtain information about the separately modulated first and second components from the optical data modulator 14, 14' for data transmission.

During calibration, the information, obtained by the DSP 18 of FIG. 1, may include estimations of frequency-dependent channel matrices for propagation of light of the individual modulated components between the optical modulation sections 22, 24 of FIGS. 1 and 2 and the photodetector 46 of FIG. 3. In some embodiments, calibration measurements may be performed separately on the first and second components by temporally interleaving transmission of light of said two components from the optical output of the optical modulator 14, 14' of FIG. 1-2 during calibration. In such embodiments, the DSP 18 may use various conventional algorithms for determination of frequency-dependent channel matrices of the two components. As example, Section VII "DYNAMIC-CHANNEL EQUALIZATION" of "Digital Coherent Optical Receivers: Algorithms and Subsystems", by Seb J. Savory, IEEE JOURNAL OF SELECTED TOPICS IN QUANTUM ELECTRONICS, VOL. 16, NO. 5, SEPTEMBER/OCTOBER 2010, pages 1164-1179, may describe some algorithms suitable for estimating such frequency-dependent channel matrices. The above-mentioned article is incorporated by reference, in its entirety, in this application.

The lower part of FIG. 4 schematically illustrates the digital measurements E output by the optical detector 16, 16' during calibration of the optical data modulator 14, 14'. Digital measurements, i.e., at intermediate frequencies, of the I and Q training sequences from the respective first and section modulation sections 22, 24 are output in the respective 1B and 2B sub-slots. Thus, during calibration measurements, the first and second modulation sections 22, 24 are operated to modulate portions of the optical carrier in a temporally interleaved manner so that only one of the first and second modulated components of the optical signal output by the optical data modulator 14, 14' has significant intensity in each measurement sub-slot 1B or 2B. In contrast, during data transmission, the first and second modulation sections 22, 24 are operated to data modulate portions of the optical wavelength carrier, temporally in parallel, so that the first and second components of the optical signal from the optical data modulator 14, 14' carry separate data in the same symbol modulation periods. The calibration provides information that may be fed back to separately pre-compensate the data streams used to drive the first and second modulation sections 22 and 24 during data transmission. For example, the pre-compensation may involve approximately inverting frequency-dependent optical channel matrices that operate on light of the two components of the output optical signal between the modulation sections 22, 24 and the optical detector 16, 16' so that imbalances between the two components, which carry separately modulated data streams, are reduced in data transmission periods.

Since the same optical detector 16, 16' of FIGS. 1 and 3 measures the frequency-dependent phase and amplitude response for light from both optical modulation sections 22, 24 in the time-interleaved calibration procedure, imprecisions of optical and/or electrical components of the optical detector 16, 16' are less likely to negatively affect the measurements relating to imbalances between the modulated components from the two modulation sections 22, 24 and the ability to reduce such imbalances. Indeed, the optical detector 16, 16' may use relatively simple components such as conventional planar 1×2 and 2×2 optical power couplers, planar optical waveguide delay lines, and a balanced photodiode pair. The optical detector 16, 16' may be integrated into the optical transmitter 10 or may be a separate component that is connected thereto as needed.

While the above embodiments illustrate the inventions for an optical data transmitter configured to transmit data on one polarization of an optical signal, the various embodiments also include optical data transmitters configured to modulate separate data on two relatively orthogonal polarizations, e.g., to carry independent data streams. In such embodiments, the apparatus and/or methods of FIGS. 1-4 may be, e.g., applied separately to the optical data modulator for each polarization component of the dual-polarization data-modulated optical signal transmitted by such an optical transmitter. In such embodiments, the optical data modulator 14, 14' for each polarization component may have a dedicated optical receiver 12 for measuring information related to imbalances, i.e., phase and/or amplitude imbalances, in the two components thereof used to carry separate or independent data streams or one optical receiver 12 may be used in a temporally interleaved manner to measuring information related to such imbalances in the two components used to carry separate data streams on each polarization component in different calibration periods.

Figure 5:
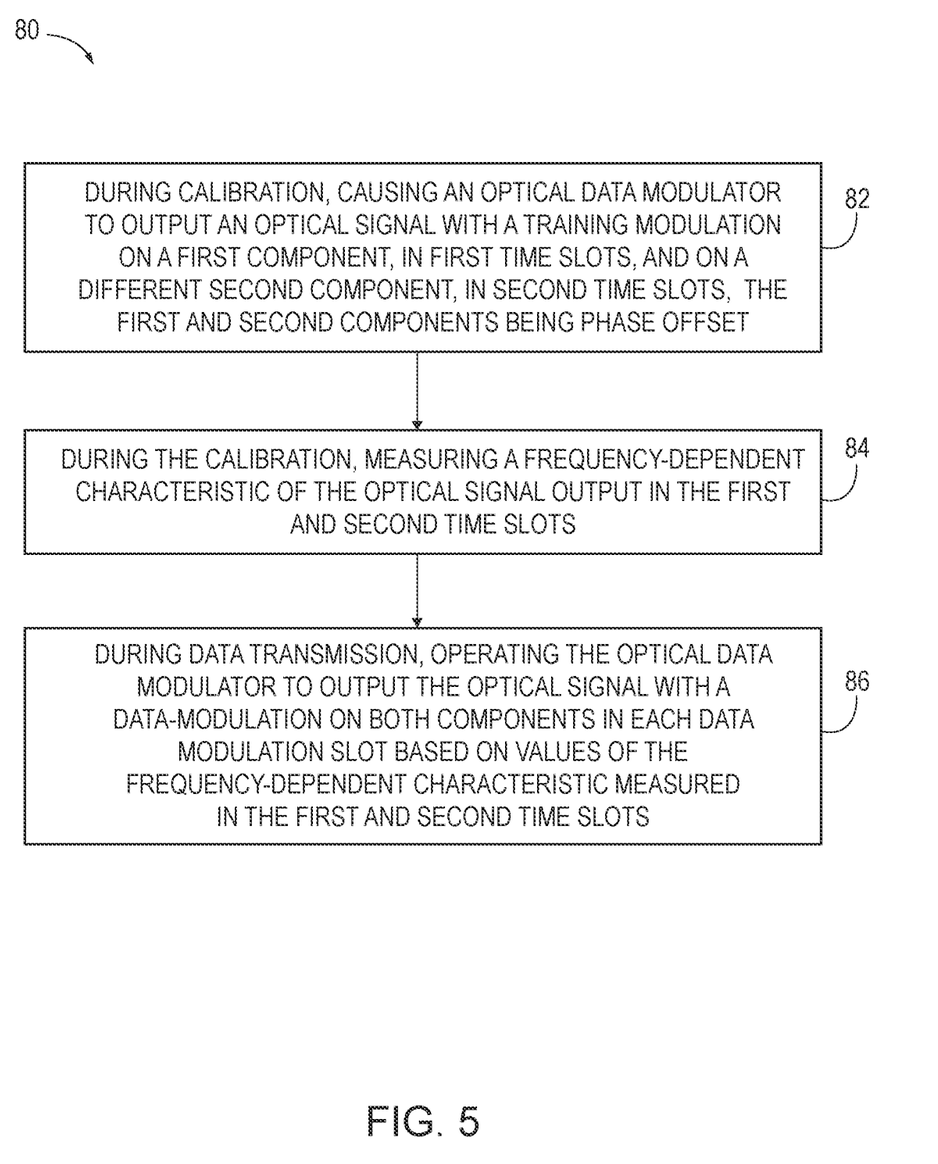
FIG. 5 illustrates a method of operating an optical transmitter, e.g., as in FIGS. 1-3.

FIG. 5 illustrates a method 80 of operating an optical data transmitter, e.g., the optical transmitter 10 illustrated by FIGS. 1-3. The method 80 involves use of separate calibration and data transmission periods for the optical data transmitter.

During a calibration period, the method 80 includes causing an optical data modulator of the optical data transmitter to output an optical signal with a training modulation on a first component, in first time slots, and with a training modulation on a different second component, in second time slots (step 82). The first component is offset from the second component by a relative phase shift. The second time slots are temporally interleaved with the first time slots. The optical signal may be, e.g., produced by the optical data modulator 14, 14' of FIGS. 1-2.

During the calibration period, the step 82 may produce the optical signal as illustrated by the timing sequence of FIG. 4.

During the calibration period, the method 80 also includes measuring a frequency-dependent characteristic of the optical signal output in the first and second time slots (step 84). The measurements of the step 84 may be made, e.g., using the optical receiver 12 of FIG. 1 with the optical detector 16 of FIG. 3 operated according to the timing sequence of FIG. 4. The measured characteristic may be, e.g., indicative of an optical channel matrix of light of the optical signal.

During a data transmission period, the method 80 includes operating the optical data modulator to output the optical signal with a data-modulation on both components in each data modulation slot based on values of the frequency-dependent characteristic measured in the first and second time slots (step 86). That is, the step 86 outputs the data modulated first and second components simultaneously during the data transmission period.

In some embodiments, the method 80 may include a further step of adjusting the optical data modulator to reduce an imbalance of a symbol-averaged power and/or a relative phase between the two components during the data transmission period. This further step of adjusting is based on the measurements produced in the first and second time slots of the calibration period.

In some embodiments, the method 80 may produce the measurements of the step 84 using the same photodetector and/or the same optical interference device in the first and second time slots of the calibration period. For some such embodiments, the measurements may be made by the photodetector measuring light from the same one or more optical outputs of the optical interference device in the first and second time slots.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
an optical source of an optical wavelength carrier;
an optical data modulator connected to receive the optical wavelength carrier and produce therefrom an optical signal to carry separate data on different first and second components thereof in individual symbol periods during data transmission and to carry a training sequence on one of the components during time slots for calibration, the apparatus being configured to cause the optical data modulator to alternate the one of the components between the first and second components over the time slots for calibration, the first component being offset from the second component by a relative phase shift;
an optical receiver connected to receive a portion of the optical signal and to temporally interleave a measurement of a characteristic of the first component and a measurement of a characteristic of the second component over the time slots for calibration, the optical receiver being configured to feedback information to the optical data modulator based on the measured characteristics; and
wherein the optical data modulator is configured to reduce an imbalance between the two components of the optical carrier during data transmission based on the information.

2. The apparatus of claim 1, wherein the imbalance includes a symbol-averaged intensity difference between the components.

3. The apparatus of claim 2, wherein the imbalance includes a frequency dependent phase offset between the components.

4. The apparatus of claim 1, wherein the imbalance includes a frequency dependent phase offset between the components.

5. The apparatus of claim 1, wherein the optical receiver use a same photodetector to measure the characteristic of the first component and to measure the characteristic of the second component during the time slots for calibration.

6. The apparatus of claim 1, wherein the optical receiver uses a same optical mixer to interfere light of the first component and to interfere light of the second component during the time slots for calibration.

7. The apparatus of claim 1, wherein the information is indicative of a frequency dependence of an optical channel matrix for light of the first component.

8. The apparatus of claim 7, wherein the information is indicative of a frequency dependence of an optical channel matrix of light of the second component.

9. The apparatus of claim 1, wherein the optical data modulator comprises first and second optical modulation sections connected to receive portions of the optical wavelength carrier in parallel, each of the optical modulation sections configured to output light of a corresponding one of the components of the optical signal.

10. The apparatus of claim 9, wherein the optical data modulator is configured to pre-compensate modulation of data streams onto the optical waveguide carrier during data transmission based on the information fed back by the optical receiver.

11. A method, comprising:
during a calibration period, causing an optical data modulator to output an optical signal with a training modulation on a first component in first time slots and with a training modulation on a different second component in second time slots, the first component being offset from the second component by a relative phase shift, the second time slots being temporally interleaved with the first time slots;

producing measurements a frequency-dependent characteristic of the optical signal in the first and second time slots; and during a data transmission period, operating the optical data modulator to output the optical signal with a data-modulation on the two components in each data modulation slot based on values of the frequency-dependent characteristic measured in the first and second time slots.

12. The method of claim 11, wherein the characteristic is indicative of an optical channel matrix of light of the optical signal.

13. The method of claim 11, further comprising adjusting the optical data modulator to reduce an imbalance between a symbol-averaged power of the two components during the data transmission period based on the measurements produced in the first and second time slots.

14. The method of claim 11, further comprising adjusting the optical data modulator to adjust the relative phase between the two components during the data transmission period based on the measurements produced in the first and second time slots.

15. The method of claim 11, wherein the producing measurements is performed using a same photodetector in the first and second time slots.

16. The method of claim 11, wherein the producing measurements is performed using a same optical interference device in the first and second time slots.

17. The method of claim 16, wherein the producing measurements is performed by a same photodetector measuring light from a same one or more optical outputs of the optical interference device in the first and second time slots.

* * * * *